US012573764B2

(12) United States Patent
Nakamura et al.

(10) Patent No.: US 12,573,764 B2
(45) Date of Patent: Mar. 10, 2026

(54) ANTENNA MODULE

(71) Applicant: Murata Manufacturing Co., Ltd., Nagaokakyo (JP)

(72) Inventors: Hayato Nakamura, Nagaokakyo (JP); Kaoru Sudo, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 272 days.

(21) Appl. No.: 18/460,693

(22) Filed: Sep. 5, 2023

(65) Prior Publication Data

US 2023/0411862 A1 Dec. 21, 2023

Related U.S. Application Data

(63) Continuation of application No. PCT/JP2022/005884, filed on Feb. 15, 2022.

(30) Foreign Application Priority Data

Mar. 5, 2021 (JP) ................................ 2021-035359

(51) Int. Cl.
*H01Q 15/08* (2006.01)
*H01Q 19/06* (2006.01)
*H01Q 21/06* (2006.01)

(52) U.S. Cl.
CPC ............. *H01Q 15/08* (2013.01); *H01Q 19/06* (2013.01); *H01Q 21/061* (2013.01)

(58) Field of Classification Search
CPC .......... H01Q 1/22; H01Q 1/2283; H01Q 1/24; H01Q 15/08; H01Q 15/10; H01Q 19/06;
(Continued)

(56) References Cited

U.S. PATENT DOCUMENTS 5,541,616 A * 7/1996 Kawahata .............. H01Q 1/243 343/702
5,955,752 A * 9/1999 Fukaya .................... H01Q 1/42 257/664

(Continued)

FOREIGN PATENT DOCUMENTS

JP H11-004118 A 1/1999
JP 2003-315438 A 11/2003

(Continued)

OTHER PUBLICATIONS

International Search Report and Written Opinion mailed on May 10, 2022, received for PCT Application PCT/JP2022/005884, filed on Feb. 15, 2022, 9 pages including English Translation.

*Primary Examiner* — Tho G Phan
(74) *Attorney, Agent, or Firm* — XSENSUS LLP

(57) ABSTRACT

An antenna module including a mount substrate that has a flat-plate shape having a surface and a surface, an RFIC that is disposed on the surface side and supplies a radio-frequency signal, and a radiating electrode, in which the mount substrate is provided with a cavity at a position overlapping with the radiating electrode assuming the mount substrate is viewed in plan view, and a periphery of the radiating electrode including an inside of the cavity is filled with a mold resin. The mold resin is provided with a lens at a position overlapping with the radiating electrode assuming the mount substrate is viewed in plan view and on the surface side.

12 Claims, 8 Drawing Sheets

(58) Field of Classification Search
CPC .... H01Q 19/062; H01Q 21/06; H01Q 21/061; H01Q 23/00; H01Q 25/00; H01Q 25/007; H01Q 3/26; H01Q 3/2658
See application file for complete search history.

(56) References Cited

U.S. PATENT DOCUMENTS

| | | | | |
|---|---|---|---|---|
| 7,683,837 | B2 * | 3/2010 | Noro .................... | H01Q 1/3233<br>343/702 |
| 11,417,949 | B2 * | 8/2022 | Sudo ...................... | H01Q 1/243 |
| 2003/0201930 | A1 * | 10/2003 | Nagasaku .............. | H01Q 19/09<br>342/175 |
| 2008/0068269 | A1 * | 3/2008 | Yamada ................... | H01Q 1/38<br>343/700 MS |

FOREIGN PATENT DOCUMENTS

| | | | |
|---|---|---|---|
| JP | 2008-072659 | A | 3/2008 |
| JP | 2009-081833 | A | 4/2009 |
| JP | 4980306 | B2 | 7/2012 |
| JP | 4988002 | B2 | 8/2012 |

* cited by examiner

ANTENNA MODULE

CROSS-REFERENCE TO RELATED APPLICATIONS

This is a continuation application of PCT/JP2022/005884, filed on Feb. 15, 2022, designating the United States of America, which is based on and claims priority to Japanese Patent Application No. JP 2021-035359 filed on Mar. 5, 2021. The entire contents of the above-identified applications, including the specifications, drawings and claims, are incorporated herein by reference in their entirety.

TECHNICAL FIELD

The present disclosure relates to an antenna module having a lens and a technique for improving antenna characteristics.

BACKGROUND ART

Japanese Unexamined Patent Application Publication No. 2009-081833 (Patent Document 1) discloses a configuration of a wireless communication device on which a dielectric lens is mounted.

In the wireless communication device disclosed in Patent Document 1, an antenna-integrated module having a patch antenna is accommodated in a housing. A dielectric lens is disposed outside the housing in a direction in which the patch antenna radiates a radio wave.

In the configuration disclosed in Patent Document 1, by changing a path of the radio wave radiated from the patch antenna using the dielectric lens, an appropriate directivity can be obtained.

CITATION LIST

Patent Document

Patent Document 1: Japanese Unexamined Patent Application Publication No. 2009-081833

SUMMARY

Technical Problem

In the wireless communication device of Patent Document 1, an air layer is formed between the patch antenna and the dielectric lens. In this case, at an interface between the air layer and the dielectric lens, impedance mismatching occurs due to a difference in permittivity, and reflection of a radio wave can be generated. As a result, an antenna gain can be deteriorated.

The present disclosure is made to solve such a problem, and an object thereof is to provide an antenna module having a lens that can suppress impedance mismatching caused by the lens so as to improve antenna characteristics.

Solution to Problem

According to an aspect of the present disclosure, an antenna module includes a mount substrate, a feeder circuit for supplying a radio-frequency signal, a radiating electrode, and a dielectric. The mount substrate has a flat-plate shape having a first surface and a second surface and includes a conductor. The feeder circuit is disposed on a side of the first surface of the mount substrate and has a third surface facing the first surface. The radiating electrode is disposed on the third surface of the feeder circuit. The mount substrate is provided with a cavity at a position overlapping with the radiating electrode assuming the mount substrate is viewed in plan view. A periphery of the radiating electrode including an inside of the cavity is filled with the dielectric. The dielectric is provided with a lens portion at a position overlapping with the radiating electrode assuming the mount substrate is viewed in plan view and on a side of the second surface of the mount substrate.

According to another aspect of the present disclosure, an antenna module includes a mount substrate, a feeder circuit for supplying a radio-frequency signal, a radiating electrode, a first dielectric, and a second dielectric. The mount substrate has a flat-plate shape having a first surface and a second surface and includes a conductor. The feeder circuit is disposed on a side of the first surface of the mount substrate and has a third surface facing the first surface. The radiating electrode is disposed at a position not overlapping with the conductor assuming the mount substrate is viewed in plan view and on the third surface of the feeder circuit. The side of the first surface is filled with the first dielectric such that the first dielectric is in contact with the radiating electrode and the first surface. A side of the second surface is filled with the second dielectric such that the second dielectric is in contact with the second surface. The second dielectric is provided with a lens portion at a position overlapping with the radiating electrode assuming the mount substrate is viewed in plan view and on the side of the second surface of the mount substrate.

Advantageous Effects of Disclosure

In the antenna module having a lens according to the present disclosure, the dielectric integrated with the lens portion is disposed on the second surface side, which is a reverse side of the first surface side of the mount substrate on which the radiating electrode is disposed. In addition, a portion between the lens portion and the radiating electrode is filled with the dielectric and/or the mount substrate, and thus no air layer is formed. By having such a configuration, the permittivity does not significantly change until a radio wave radiated from an antenna element reaches the lens, and thus impedance mismatching does not occur and antenna characteristics can be improved.

DESCRIPTION OF EMBODIMENTS

Figure 1:
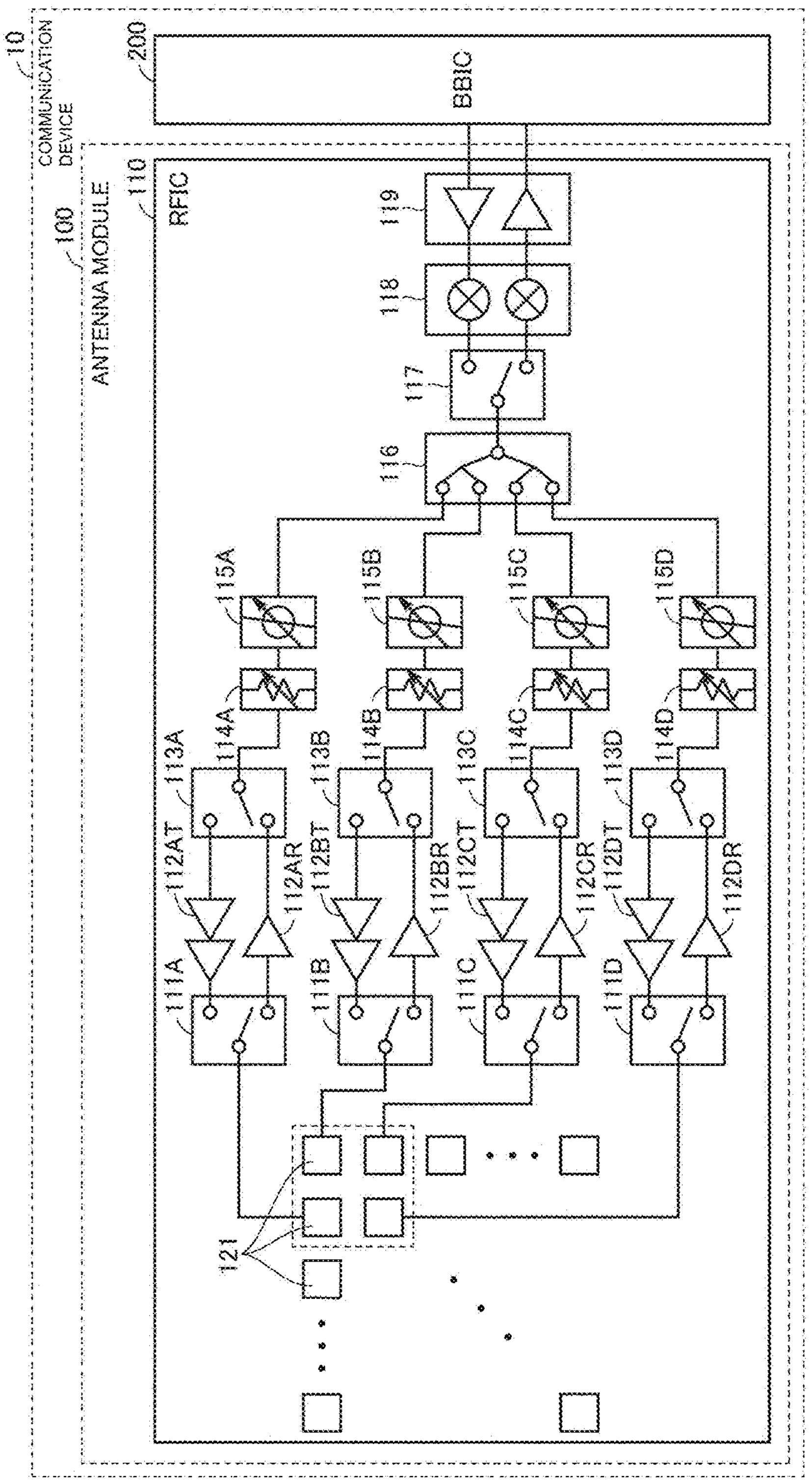
FIG. 1 is an example of a block diagram of a communication device according to a first embodiment.

Hereinafter, embodiments of the present disclosure will be described in detail with reference to the drawings. Note that the same or corresponding parts in the drawings are denoted by the same reference numerals, and description thereof will not be repeated.

First Embodiment (Basic Configuration of Communication Device)

FIG. 1 is an example of a block diagram of a communication device 10 according to a first embodiment. Examples of the communication device 10 include a mobile terminal such as a mobile phone, a smart phone, or a tablet, a personal computer including a communication function, a base station, and smart glasses. An example of a frequency band of a radio wave used for an antenna module 100 according to the first embodiment is a radio wave of a millimeter wave band, of which the center frequency is, for example, 28 GHz, 39 GHz, 60 GHz, or the like, but radio waves other than the above frequency band are also applicable.

With reference to FIG. 1, the communication device 10 includes the antenna module 100 and a baseband integrated circuit (BBIC) 200 that configures a baseband signal processing circuit. The antenna module 100 includes an RFIC 110 for supplying a radio-frequency signal. The communication device 10 up-converts, to a radio-frequency signal, a signal transmitted from the BBIC 200 to the antenna module 100 in the RFIC 110 and radiates the signal from a radiating electrode 121. In addition, the communication device 10 transmits a radio-frequency signal received in the radiating electrode 121 to the RFIC 110, down-converts the signal, and then processes the signal in the BBIC 200.

In FIG. 1, in order to simplify the description, only a configuration corresponding to four radiating electrodes 121, among a plurality of the radiating electrodes 121 included in the antenna module 100, is illustrated, and a configuration corresponding to other radiating electrodes 121 having a similar configuration is omitted. Note that in FIG. 1, an example in which the plurality of radiating electrodes 121 is arranged in a two-dimensional array state is illustrated, but the radiating electrodes 121 may not be plural, and the antenna module 100 may have one radiating electrode 121. Alternatively, the plurality of radiating electrodes 121 may be arranged in a one-dimensional array state. In the first embodiment, an example in which each radiating electrode 121 is a patch antenna having a substantially square flat-plate shape is described, but the shape of the radiating electrode 121 may be a round, an ellipse, or other types of polygon such as a hexagon.

The RFIC 110 includes switches 111A to 111D, 113A to 113D, and 117, power amplifiers 112AT to 112DT, low noise amplifiers 112AR to 112DR, attenuator 114A to 114D, phase shifters 115A to 115D, a signal multiplexer/demultiplexer 116, a mixer 118, and an amplifier circuit 119.

Assuming a radio-frequency signal is transmitted, the switches 111A to 111D and 113A to 113D are switched to the power amplifiers 112AT to 112DT sides, and at the same time, the switch 117 is connected to a transmitting side amplifier of the amplifier circuit 119. Assuming a radio-frequency signal is received, the switches 111A to 111D and 113A to 113D are switched to the low noise amplifiers 112AR to 112DR sides, and at the same time, the switch 117 is connected to a receiving side amplifier of the amplifier circuit 119.

The signal transmitted from the BBIC 200 is amplified in the amplifier circuit 119 and up-converted in the mixer 118. A transmitting signal, which is the up-converted radio-frequency signal, is demultiplexed into four signals in the signal multiplexer/demultiplexer 116 and is fed to different radiating electrodes 121 through four signal paths, respectively. At this time, by individually adjusting the phase shift degrees of the phase shifters 115A to 115D disposed on the respective signal paths, the directivities of the radiating electrodes 121 can be adjusted. In addition, the attenuators 114A to 114D adjust the strength of the transmitting signal.

The receiving signals, which are radio-frequency signals, received by the respective radiating electrodes 121 pass through four different signal paths and multiplexed in the signal multiplexer/demultiplexer 116. The multiplexed signal is down-converted in the mixer 118, is amplified in the amplifier circuit 119, and is transmitted to the BBIC 200.

The RFIC 110 is formed, for example, as a one-chip integrated circuit component including the above circuit configuration. Alternatively, the units (switch, power amplifier, low noise amplifier, attenuator, and phase shifter) in the RFIC 110 corresponding to each of the radiating electrodes 121 may be formed as a one-chip integrated circuit component for each of the corresponding radiating electrodes 121.

(Configuration of Antenna Module)

Figure 2:
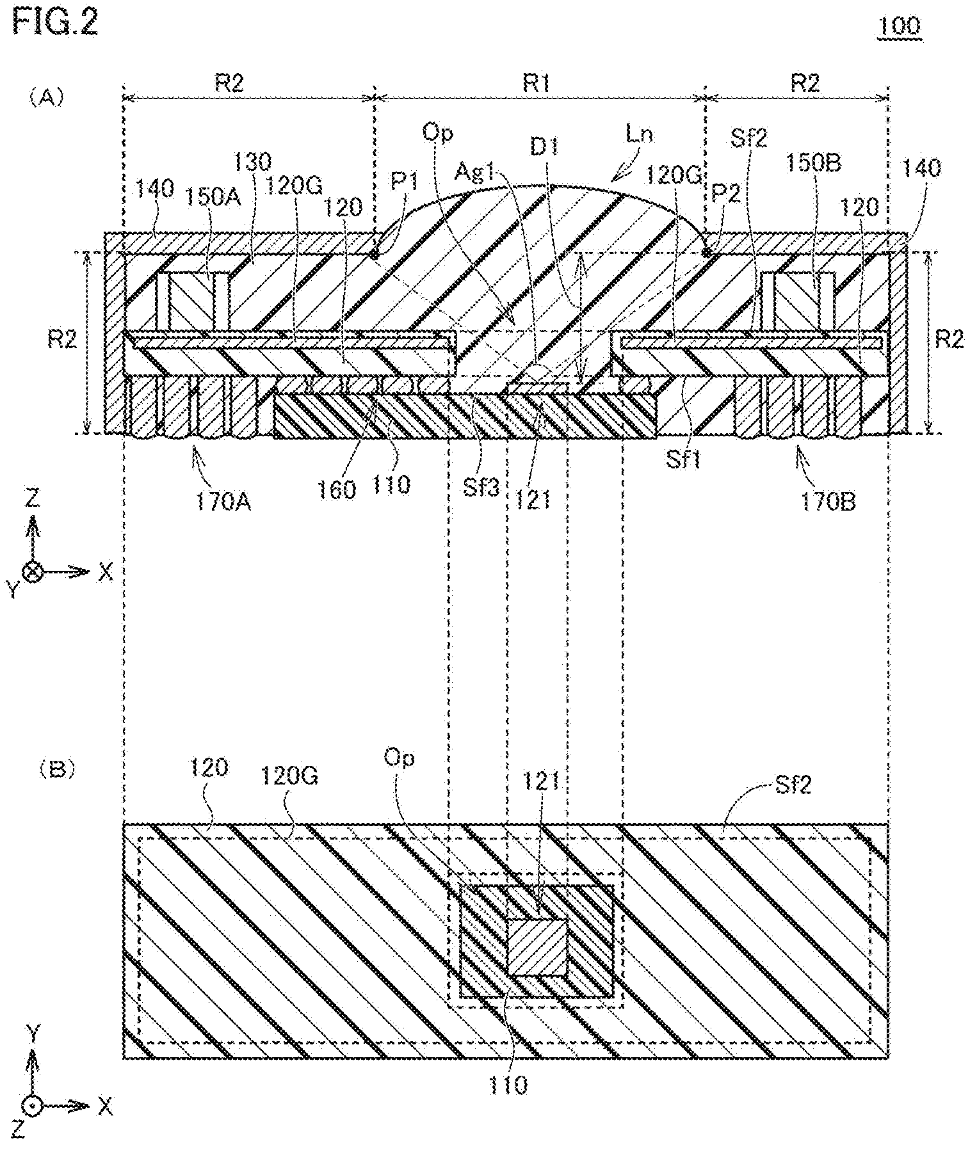
FIG. 2 includes a sectional view (FIG. 2 (A)) of an antenna module according to the first embodiment, and a plan view (FIG. 2 (B)) of a mount substrate, a radio-frequency integrated circuit (RFIC), and a radiating electrode in FIG. 2 (A).

Next, with reference to FIG. 2, details of the antenna module 100 in FIG. 1 will be described. FIG. 2 includes a sectional view (FIG. 2 (A)) of the antenna module 100 in the first embodiment, and a plan view (FIG. 2 (B)) of a mount substrate 120, the RFIC 110, and the radiating electrode 121 in FIG. 2 (A).

As illustrated in FIG. 2 (A), the antenna module 100 is a lens antenna including a lens Ln. The antenna module 100 includes the mount substrate 120 having a flat-plate shape, the RFIC 110, and a mold resin 130. Peripheries of the radiating electrode 121 and the mount substrate 120 are filled with the mold resin 130. The projecting lens Ln is formed in the mold resin 130. The lens Ln has a hemispherical shape that is disposed so as to project from the mold resin 130. Note that the shape of the lens Ln may be recessed, instead of projecting.

Note that in the following description, a thickness direction of the mount substrate 120 is defined as a Z-axis direction, and surfaces perpendicular to the Z-axis direction are defined as an X-axis and a Y-axis. In addition, a positive direction of the Z-axis in each figure may be referred to as an upper surface side, and a negative direction may be referred to as a lower surface side. The mold resin 130 corresponds to a "dielectric" in the present disclosure, and the RFIC 110 corresponds to a "feeder circuit" in the present disclosure.

The mount substrate 120 is, for example, a substrate whose base material is a dielectric. The base material of the mount substrate 120 is, for example, a resin such as epoxy and polyimide. In addition, the base material of the mount substrate 120 may be a resin such as a liquid crystal polymer (LCP), a fluorine-based resin, and a polyethylene terephthalate (PET) material that have lower permittivity, or low temperature co-fired ceramics (LTCC). The mount substrate 120 illustrated in FIG. 2 is a single layer, but as will be described later, the mount substrate 120 may be a multilayer resin substrate formed by laminating a plurality of layers made of the above resins. Note that the base material forming the mount substrate 120 may be a base material other than a resin.

The mount substrate 120 is a substrate including a conductor 120G inside. The conductor 120G is disposed over substantially the entire surface of the flat plate of the mount substrate 120 in an XY plane and becomes a ground electrode. The RFIC 110 is mounted on a surface Sf1 of the mount substrate 120 on the negative direction side of the Z-axis. An electronic component 150A and an electronic component 150B are mounted on a surface Sf2 of the mount substrate 120 on the positive direction side of the Z-axis. The RFIC 110 is electrically connected to the mount substrate 120 with a connection member 160 interposed therebetween.

The RFIC 110 includes a semiconductor substrate such as silicon, a conductive layer, a dielectric layer, a protective film, and the like. As illustrated in FIG. 2, the RFIC 110 has a surface Sf3 facing the surface Sf1 of the mount substrate 120. In the example of FIG. 2, the connection member 160 is formed of a plurality of solder bumps. The connection member 160 is connected to terminals (not illustrated) disposed on the surface Sf1 of the mount substrate 120 and the surface Sf3 of the RFIC 110. As a result, the mount substrate 120 is electrically connected to the RFIC 110. Connection terminals 170A and 170B are formed on the surface Sf1 of the Z-axis of the mount substrate 120, and the mount substrate 120 is connected to an external substrate and the like by the connection terminals 170A and 170B. Note that the surface Sf1 corresponds to a "first surface" in the present disclosure, the surface Sf2 corresponds to a "second surface" in the present disclosure, and the surface Sf3 corresponds to a "third surface" in the present disclosure.

Any one of the plurality of solder bumps included in the connection member 160 transmits a radio-frequency signal to the radiating electrode 121. The solder bump that transmits the radio-frequency signal may generate capacitance coupling with a wiring pattern (not illustrated) disposed in a layer inside the RFIC 110. In this case, the radio-frequency signal is transmitted to the radiating electrode 121 by the wiring pattern. Moreover, capacitance coupling may be obtained between the wiring pattern and the radiating electrode 121. Note that a method of feeding to the radiating electrode 121 is not limited to the mode illustrated in FIG. 2. For example, the radiating electrode 121 may be fed by using an Si through-silicon via (TSV). That is, the radiating electrode 121 may be connected to the mount substrate 120 using a through-silicon via that penetrates the RFIC 110.

In the antenna module 100 of the first embodiment, the radiating electrode 121 is disposed on the surface Sf3 of the RFIC 110. The radiating electrode 121 is formed of a single radiating element. In the mount substrate 120, a cavity Op is formed between the radiating electrode 121 and the lens Ln. As illustrated in FIG. 2(B), assuming the mount substrate 120 is viewed in plan view from the positive direction side of the Z-axis, the radiating electrode 121 is disposed inside the cavity Op. As illustrated in FIG. 2(A), the surface Sf1 side and the surface Sf2 side of the mount substrate 120 and the inside of the cavity Op are filled with the mold resin 130, and the mold resin 130 is in contact with the radiating electrode 121. As a result, an electronic component and the like mounted on the mount substrate 120 are fixed by the mold resin 130, and mechanical strength is improved. A base material forming the mold resin 130 is, for example, a thermosetting resin such as an epoxy resin. Note that the base material forming the mold resin 130 may be other materials.

The mold resin 130 is covered a sputter shield 140. The sputter shield 140 is formed by causing a metal material including Cu to accumulate on a surface of the mold resin 130 by sputtering. The metal material for forming the sputter shield 140 may be a metal material including Au or Ag. In the mold resin 130, the sputter shield 140 is formed so as to cover a region R2 in which the lens Ln is not formed. In FIG. 2, for convenience of description, for the region R2, only an XY plane and a YZ plane of the mold resin 130 are illustrated, but the region R2 includes an XZ plane of the mold resin 130 and corner portions and ridges formed by each plane. That is, the region R2 is a region except for a region R1 in which the lens Ln is formed on a surface of the mold resin 130.

The sputter shield 140 is formed on the region R2. In addition, the sputter shield 140 does not cover the region R1 in which the lens Ln is formed in the mold resin 130. In other words, the lens Ln is not covered with the sputter shield 140.

A signal is transmitted between the electronic components 150A and 150B and the mount substrate 120 illustrated in FIG. 2. Assuming the signal is transmitted between the electronic components 150A and 150B and the mount substrate 120, unnecessary radio waves may be radiated from the electronic components 150A and 150B. In the antenna module 100, assuming the mount substrate 120 is viewed in plan view, the sputter shield 140 is disposed at a position overlapping with the electronic components 150A and 150B. In other words, the electronic components 150A and 150B are covered with the sputter shield 140. As a result, in the antenna module 100, radiation of radio waves radiated from the electronic components 150A and 150B to the outside of the antenna module 100 can be suppressed. Note that the sputter shield 140 corresponds to a "conductive layer" in the present disclosure.

The lens Ln has a round shape assuming the mount substrate 120 is viewed in plan view. At an edge of the lens Ln, which is also a peripheral edge of the lens Ln at which the projecting lens Ln and the sputter shield 140 are in contact, in the example of FIG. 2(A), an end portion P1 and an end portion P2 are illustrated. Since the lens Ln has a round shape assuming the mount substrate 120 is viewed in plan view, the end portion P2 is located at a position the farthest away from the end portion P1.

An angle Ag1 is an angle formed by a direction from the radiating electrode 121 toward the end portion P1 and a direction from the radiating electrode 121 toward the end portion P2. In general, a radiation angle of the radiating electrode 121, which is a patch antenna, is equal to or less than 120°. Therefore, assuming the lens Ln is disposed such that the angle Ag1 exceeds 120°, the lens Ln has a region through which a radio wave does not pass. Therefore, in the antenna module 100, the radiating electrode 121 and the lens Ln are disposed such that the angle Ag1 formed by the direction from the radiating electrode 121 toward the end portion P1 and the direction from the radiating electrode 121 toward the end portion P2 is equal to or less than 120°. In addition, the cavity Op formed in the mount substrate 120 is formed so as not to overlap with a straight line connecting the radiating electrode 121 to the end portion P1 and a straight line connecting the radiating electrode 121 to the end portion P2. As a result, a dimension of the lens Ln that is not covered with the sputter shield 140 can be prevented from being unnecessarily large. That is, the radio waves radiated from the electronic components 150A and 150B are prevented from being radiated to the outside of the antenna module 100 through the lens Ln.

As described above, in the mold resin 130, the projecting lens Ln is formed at a position overlapping with the radiating electrode 121 assuming the mount substrate 120 is viewed in plan view. The mold resin 130 having the lens Ln is formed using a mold. For example, a shape corresponding to the lens Ln is formed in the mold, and assuming a resin is poured into the mold and solidified, the mold resin 130 having the lens Ln is formed.

The lens Ln improves convergence of a radio-frequency signal radiated from the radiating electrode 121. In other words, the lens Ln changes a beam shape of the radio-frequency signal radiated by the radiating electrode 121 to improve a gain. That is, in a case where the mold resin 130 has the lens Ln, compared to a case in which the mold resin 130 does not have the lens Ln, the gain of the antenna module 100 improves. Note that assuming the lens Ln has a recessed shape, the beam width becomes wide.

In the antenna module 100, the mold resin 130 is formed such that a portion between the lens Ln and the radiating electrode 121 is solid. In addition, in the example of FIG. 2, the mold resin 130 is formed of a single layer resin whose permittivity is uniform. As a result, between the lens Ln and the radiating electrode 121 including the inside of the cavity Op, the permittivity does not significantly change. The radiated radio wave is, in general, reflected assuming passing through a region in which the permittivity change is large. The larger the permittivity change is, the more likely the radiated radio wave is reflected. That is, the antenna gain is deteriorated. In the example of FIG. 2, since the mold resin 130 between the lens Ln and the radiating electrode 121 is formed of a single layer resin whose permittivity is uniform, the radio wave radiated by the radiating electrode 121 is less likely to be reflected. That is, an interface between objects having significantly different permittivity does not exist between the lens Ln and the radiating electrode 121. The interface is, for example, an interface between the mold resin 130 having high permittivity and an air layer having low permittivity and is a surface on which impedance mismatching occurs. Since an interface on which the permittivity significantly changes does not exist in the antenna module 100, impedance mismatching can be suppressed, and reflection of a radio wave can be suppressed.

In this manner, in the antenna module 100 in the first embodiment, since the portion between the radiating electrode 121 and the lens Ln is solid in the mold resin 130, and an interface between objects having significantly different permittivity does not exist, compared to a case in which an air layer is formed between the radiating electrode 121 and the lens Ln, the radio wave radiated from the radiating electrode 121 is less likely to be reflected. That is, in the antenna module 100, deterioration of the antenna gain is suppressed. Therefore, in the antenna module 100, the antenna characteristics improve.

In the Z-axis direction, the radiating electrode 121 and the lens Ln are disposed apart by a distance D1. Assuming a wavelength λ is a wavelength of a radio-frequency signal supplied by the RFIC 110, the distance D1 is equal to or longer than 1λ. As a result, compared to a case in which the distance between the radiating electrode 121 and the lens Ln is less than 1λ, the distance of the radio wave radiated from the lens Ln becomes long. That is, in the antenna module 100, the function of the lens Ln improves.

Moreover, in the antenna module 100, the RFIC 110 is disposed on the surface Sf1 side of the mount substrate 120. Here, a case in which the RFIC 110 is disposed on the surface Sf2 side of the mount substrate 120 and the distance D1 is secured between the lens Ln and the radiating electrode 121 is considered. In this case, in order to secure the distance D1, the disposition of the lens Ln needs to be moved further toward the positive direction side of the Z-axis than the state of FIG. 2. That is, a thickness of the antenna module 100 itself in the Z-axis direction may increase. On the other hand, in the antenna module 100 of the present embodiment, since the RFIC 110 is disposed on the surface Sf1 side of the mount substrate 120, the disposition of the lens Ln does not have to be moved in order to secure the distance D1. Therefore, the distance D1 can be secured while the height of the antenna module 100 is reduced.

Assuming the distance D1 is made long, the function of the lens Ln improves. On the other hand, assuming the distance D1 becomes too long, the radio wave of a wavelength that can resonate in a shield increases. As a result, unnecessary resonance in which an interference with the radio wave radiated from the radiating electrode 121 occurs is likely to be generated. Therefore, in the antenna module 100, the distance D1 between the lens Ln and the radiating electrode 121 is desirably equal to or more than 1λ and equal to or less than 10λ. As a result, in the antenna module 100, generation of unnecessary resonance can be suppressed while the function of the lens Ln is improved.

Note that the mold resin 130 in FIG. 2 may not be formed from a uniform base material. For example, in the mold resin 130, a plurality of base materials may be formed into a gradually layered shape. At this time, the base material of each layer that forms the mold resin 130 is selected so that a difference in permittivity is within a predetermined range between adjacent base materials, among the base materials that are formed into a layered shape. As a result, reflection of a radio wave between the base materials can be suppressed.

A layer, of the layers forming the mold resin 130, that is disposed on the most negative direction side of the Z-axis and in contact with the radiating electrode 121 is formed with a first base material that has relatively high permittivity. On the positive direction side of the Z-axis of the layer of the first base material, a layer of a second base material whose permittivity is lower than the first base material is disposed. The difference in permittivity between the first base material and the second base material is a difference to such an extent that an interface on which a radio wave is significantly reflected is not generated. In addition, on the positive direction side of the Z-axis of the layer of the second material, a layer of a third base material whose permittivity is lower than the second baes material is disposed. The difference in permittivity between the second base material and the third base material is a difference to such an extent that an interface on which a radio wave is significantly reflected is not generated.

In this manner, since the mold resin 130 has gradual layers in which the permittivity gradually decreases, from the radiating electrode 121 to the lens Ln, generation of an interface on which a reflection amount of a radio wave becomes great can be suppressed. In other words, the mold resin 130 may include a plurality of base materials and be formed so as to include the plurality of base materials whose permittivity gradually changes as gradation.

Second Embodiment

In the antenna module 100 of the first embodiment, a configuration in which the cavity Op is formed in the mount substrate 120 between the lens Ln and the radiating electrode 121 has been described. In a second embodiment, a configuration that does not deteriorate the antenna gain without forming a cavity in the mount substrate 120 between the lens Ln and the radiating electrode 121 will be described. Note that in an antenna module 100A of the second embodiment, description of configurations overlapping with the antenna module 100 of the first embodiment will not be repeated.

Figure 3:
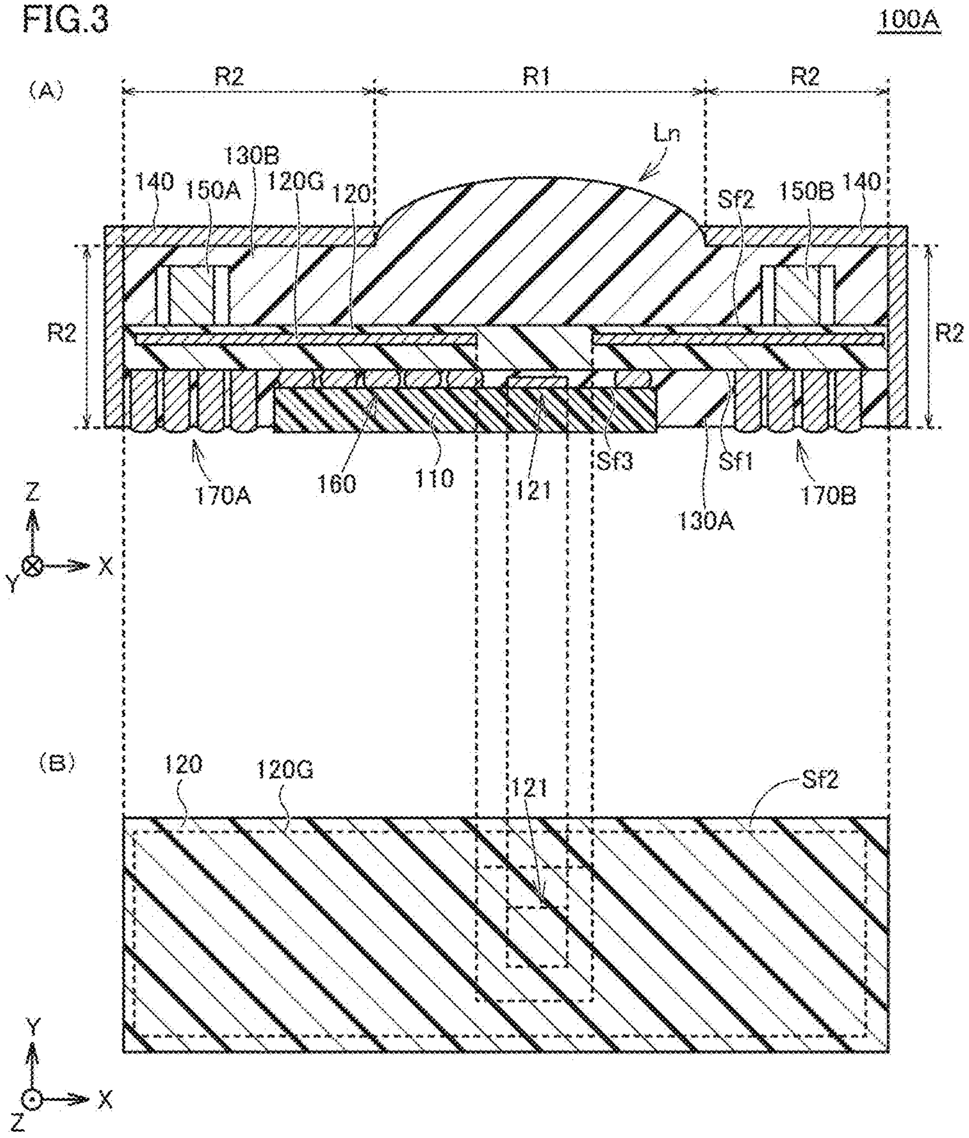
FIG. 3 includes a sectional view (FIG. 3 (A)) of an antenna module according to a second embodiment, and a plan view (FIG. 3 (B)) of a mount substrate, an RFIC, and a radiating electrode in FIG. 3 (A).

FIG. 3 includes a sectional view (FIG. 3 (A)) of the antenna module 100A according to the second embodiment, and a plan view (FIG. 3 (B)) of the mount substrate 120 in FIG. 3 (A).

In the mount substrate 120 in the antenna module 100A, a cavity such as the one illustrated in FIG. 2 is not formed. Therefore, as illustrated in FIG. 3 (B), assuming the mount substrate 120 is viewed in plan view from the positive direction side of the Z-axis, the radiating electrode 121 is covered with the mount substrate 120.

As illustrated in FIG. 3, the mount substrate 120 is disposed between the radiating electrode 121 and the lens Ln. On the other hand, the conductor 120G included in the inside of the mount substrate 120 is not disposed between the radiating electrode 121 and the lens Ln. In other words, in the example of FIG. 3, the mount substrate 120 not including the conductor 120G is disposed in the region in which the cavity Op is formed in FIG. 2, in the mount substrate 120.

That is, the radiating electrode 121 is disposed at a position not overlapping with the conductor 120G assuming the mount substrate 120 is viewed in plan view. In addition, the radiating electrode 121 is also disposed at a position not overlapping with the electronic components 150A and 150B assuming the mount substrate 120 is viewed in plan view. As a result, the radio wave radiated from the radiating electrode 121 toward the lens Ln is not shielded by the conductor 120G, and the electronic components 150A and 150B.

In this manner, in the antenna module 100A, since a cavity is not formed in the mount substrate 120, a space on the surface Sf1 side of the mount substrate 120 and a space on the surface Sf2 side of the mount substrate 120 are separated by the mount substrate 120. Therefore, in the antenna module 100A, the space on the surface Sf1 side and the space on the surface Sf2 side covered with the sputter shield 140 are filled with a mold resin 130A and a mold resin 130B, respectively.

The mold resin 130A filling the space on the surface Sf1 side is disposed so as to be in contact with the radiating electrode 121 and the surface Sf1. The mold resin 130B the space on the surface Sf2 side is disposed so as to be in contact with the surface Sf2. In the mold resin 130B, a portion between the lens Ln and the surface Sf2 of the mount substrate 120 is solid. In addition, in the mold resin 130A, a portion between the radiating electrode 121 and the surface Sf1 of the mount substrate 120 is solid.

Between the radiating electrode 121 and the lens Ln, in order from the negative direction side of the Z-axis, the mold resin 130A, the mount substrate 120 not including the conductor 120G, and the mold resin 130B are disposed. As described above, the mount substrate 120 is formed of a resin such as epoxy and polyimide. That is, the difference in permittivity between the mount substrate 120 and the mold resins 130A and 130B is smaller than the difference in permittivity between air and the mold resins 130A and 130B.

As a result, compared to a case in which an air layer exists between the lens Ln and the radiating electrode 121, in the antenna module 100A, the permittivity does not significantly change between the lens Ln and the radiating electrode 121. That is, in the antenna module 100A, since an interface on which the permittivity significantly changes such as an interface generated between an air layer and a mold resin does not exist, impedance mismatching can be suppressed, and reflection of a radio wave can be suppressed.

In this manner, in the antenna module 100A according to the second embodiment, assuming the conductor 120G and the electronic components 150A and 150B are disposed at positions not overlapping with the radiating electrode 121 assuming the mount substrate 120 is viewed in plan view. In addition, portions between the lens Ln and the surface Sf2 and between the radiating electrode 121 and the surface Sf1 are filled with the mount substrate 120 and the mold resins 130A and 130B. As a result, without forming a cavity in the mount substrate 120, reflection of the radio wave radiated from the radiating electrode 121 can be suppressed, and deterioration of the antenna gain can be suppressed. Therefore, in the antenna module 100A, the antenna characteristics improve. Note that the mold resin 130A corresponds to a "first dielectric" in the present disclosure, and the mold resin 130B corresponds to a "second dielectric" in the present disclosure.

Third Embodiment

In the antenna module 100 according to the first embodiment, a configuration in which a portion between the RFIC 110 and the electronic component 150A or the electronic component 150B is filled with only the mold resin 130. In a third embodiment, a configuration that suppresses generation of unnecessary resonance is suppressed using conductive shields 180A and 180B will be described. Note that in an antenna module 100B of the third embodiment, description of configurations overlapping with the antenna module 100 of the first embodiment will not be repeated.

Figure 4:
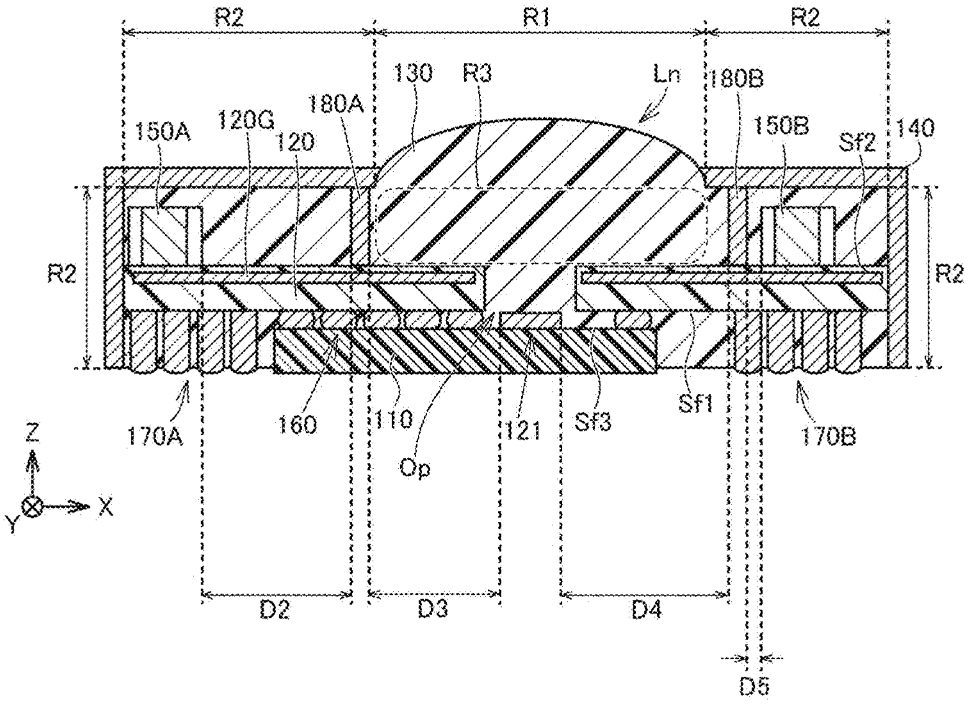
FIG. 4 is a sectional view of an antenna module according to a third embodiment.

FIG. 4 is a sectional view of the antenna module 100B according to the third embodiment. As illustrated in FIG. 4, the conductive shield 180A is disposed between the electronic component 150A and a region R3 overlapping with the lens Ln assuming the mount substrate 120 in the mold resin 130 is viewed in plan view. In addition, the conductive shield 180B is disposed between the region R3 and the electronic component 150B. The conductive shields 180A and 180B are formed of a conductive member. The conductive shields 180A and 180B are connected to a ground electrode. Note that the region R3 that overlaps with the lens Ln assuming the mount substrate 120 in the mold resin 130 is viewed in plan view corresponds to a "third region" in the present disclosure.

In the antenna module 100B illustrated in FIG. 4, the conductive shields 180A and 180B have a wall shape. That is, the conductive shields 180A and 180B have a length in the Y-axis direction and divide a region filled with the mold resin 130 into three. The conductive shields 180A and 180B shield radio waves generated from the electronic components 150A and 150B and suppress generation of noise. Each of the RFIC 110 and the electronic components 150A and 150B is disposed in an independent space separated by the conductive shields 180A and 180B. As illustrated in FIG. 4, the conductive shields 180A and 180B desirably form independent spaces that are disposed between the sputter shield 140 and the mount substrate 120 and are isolated, but a cavity may be formed in a part of each of the conductive shields 180A and 180B.

Note that the conductive shields 180A and 180B may have a shape other than a wall shape as long as the conductive shields 180A and 180B can shield an electromagnetic wave. For example, the conductive shields 180A and 180B may have a columnar shape, a wire shape, or a mesh shape. The columnar shape may be a shape of at least one bar disposed between the mount substrate 120 and the sputter shield 140. Assuming the conductive shields 180A and 180B have a columnar shape, compared to a case of having a wall shape, regions in which the RFIC 110 and the electronic components 150A and 150B are disposed are not separated, generation of noise is suppressed, and the manufacturing cost can be reduced. Assuming the conductive shields 180A and 180B have a columnar shape, a plurality of columns may be disposed between the RFIC 110 and the electronic components 150A and 150B.

The wire shape is a shape formed of at least one conductive wire that is thinner than the columnar shape. Assuming the conductive shields 180A and 180B have a wire shape, the conductive shields 180A and 180B may be formed of a plurality of wires that extends in the Y-axis direction. The conductive shields 180A and 180B each correspond to a "conductive member" in the present disclosure. Assuming the conductive shields 180A and 180B are disposed, generation of unnecessary resonance with respect to the radio wave radiated by the radiating electrode 121 can be suppressed. In addition, assuming the conductive shields 180A and 180B are disposed, through the conductive shields 180A and 180B, heat generated in the electronic components 150A and 150B can be transmitted to the outside of the antenna module 100B, and the heat dissipation efficiency can be improved in the antenna module 100B.

Assuming the conductive shield 180A is focused, the conductive shield 180A is disposed on the radiating electrode 121 side. That is, a distance D3 between the conductive shield 180A and the radiating electrode 121 is shorter than a distance D2 between the conductive shield 180A and the electronic component 150A. In other words, the distance D2 is longer than the distance D3. In this manner, since the distance D2 is longer than the distance D3, in the antenna module 100B, a distance from the radiating electrode 121 to the conductive shield 180A becomes short, and a frequency band of a radio wave that resonates with the radio wave radiated from the radiating electrode 121 can be made narrow. That is, in the antenna module 100B, generation of unnecessary resonance can be suppressed.

Assuming the conductive shield 180B is focused, the conductive shield 180B is disposed near the electronic component 150B. That is, a distance D5 between the conductive shield 180B and the electronic component 150B is shorter than a distance D4 between the conductive shield 180B and the radiating electrode 121. In other words, the distance D4 is longer than the distance D5. In this manner, since the distance D4 is longer than the distance D5, in the antenna module 100B, the heat dissipation efficiency of the amount of heat generated by the electronic component 150B can be improved.

Note that the conductive shields 180A and 180B are not limited to having a shape having a length in the Y-axis direction and may have a shape having a length in the X-axis direction. For example, a conductive shield may be formed so as to surround the periphery of the cavity Op. As a result, generation of unnecessary resonance can be more reliably suppressed.

Fourth Embodiment

In the antenna module 100 of the first embodiment, a configuration in which the radiating electrode 121 is a single patch antenna has been described. In a fourth embodiment, a configuration of an antenna module 100C having a plurality of radiating elements will be described. Note that in the antenna module 100C of the fourth embodiment, description of configurations overlapping with the antenna module 100 of the first embodiment will not be repeated.

Figure 5:
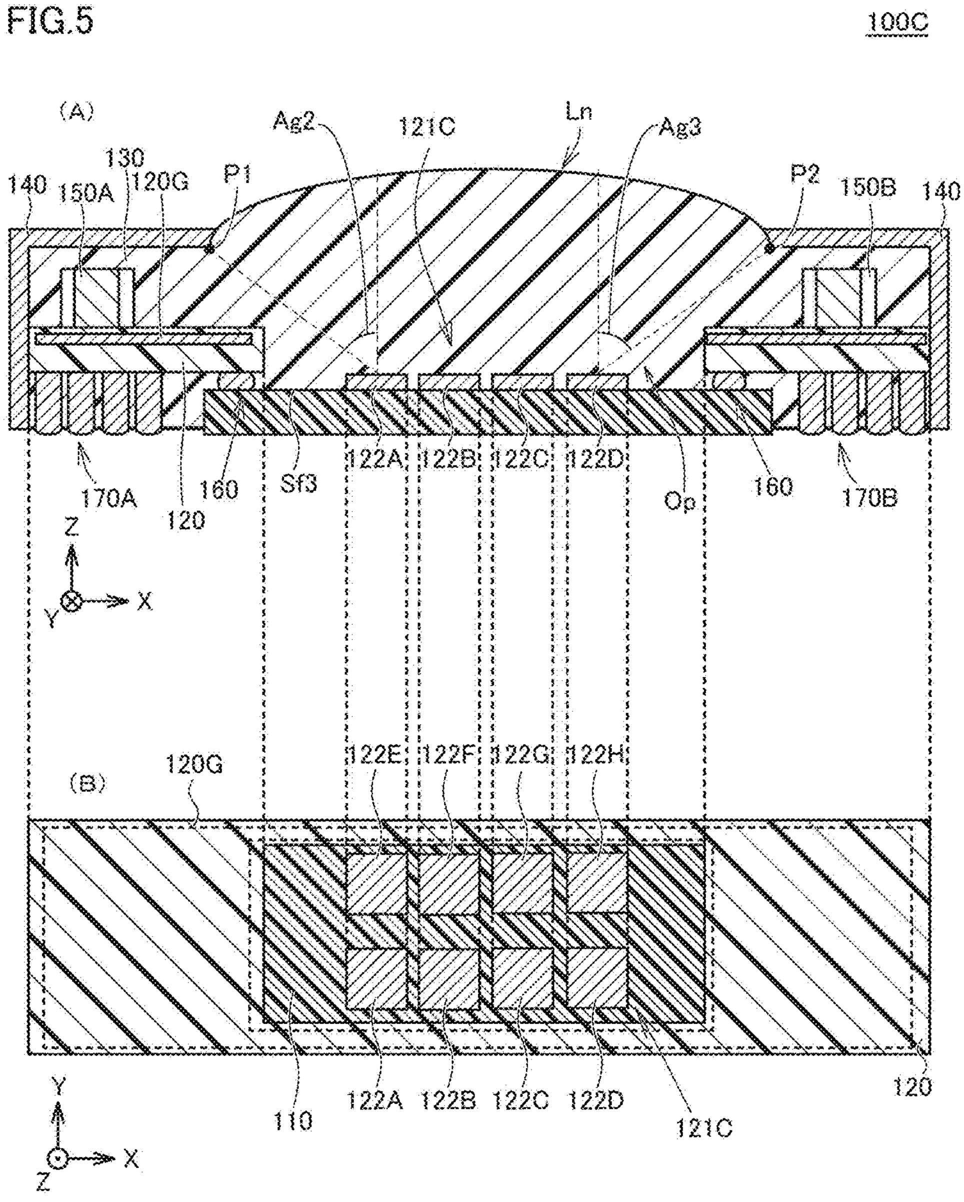
FIG. 5 includes a sectional view (FIG. 5 (A)) of an antenna module according to a fourth embodiment, and a plan view (FIG. 5 (B)) of a mount substrate, an RFIC, and a radiating electrode in FIG. 5 (A).

FIG. 5 includes a sectional view (FIG. 5 (A)) of the antenna module 100C according to the fourth embodiment and a plan view (FIG. 5 (B)) of the mount substrate 120, the RFIC 110, and the radiating electrode 121C in FIG. 5 (A). As illustrated in FIG. 5, in the antenna module 100*c*, a radiating electrode 121C is disposed on the surface Sf3 on the positive direction side of the Z-axis of the RFIC 110. As illustrated in FIGS. 5 (A) and 5 (B), the radiating electrode 121C includes a plurality of radiating elements 122A to 122H that is arranged in a two-dimensional array state. That is, the radiating electrode 121C forms an array antenna.

An angle Ag2 is an angle formed by a direction from the radiating element 122A toward the end portion P1 and the positive direction of the Z-axis. An angle Ag3 is an angle formed by a direction from the radiating element 122D toward the end portion P2 and the positive direction of the Z-axis. As described above, in general, a radiation angle of a patch antenna is equal to or less than 120°. Therefore, in the antenna module 100C, the radiating electrode 121C and the lens Ln are disposed such that an angle obtained by adding the angle Ag3 to the angle Ag2 is equal to or less than 120°. In addition, the cavity Op formed in the mount substrate 120 is formed so as not to overlap with a straight line connecting the radiating element 122A to the end portion P1 and a straight line connecting the radiating element 122D to the end portion P2. As a result, the dimension of the lens Ln not covered with the sputter shield 140 is prevented from being unnecessarily large. That is, radio waves radiated from the electronic components 150A and 150B can be prevented from being radiated to the outside of the antenna module 100C through the lens Ln.

In the antenna module 100C, described above, having an array type antenna as well, a portion between the radiating electrode 121C and the lens Ln is solid in the mold resin 130, and an interface between objects having significantly different permittivity does not exist. Therefore, compared to a case in which an air layer is formed between the radiating electrode 121C and the lens Ln, the ratio of generation of reflection of a radio wave radiated from the radiating electrode 121C decreases. As a result, since a region in which the degree of change of the permittivity is large does not exist, reflection of a radio wave can be suppressed, the antenna characteristics can be improved, and beamforming can be performed by using a plurality of radiating elements.

Fifth Embodiment

In the antenna module 100 of the first embodiment, a configuration in which the projecting lens Ln is formed in the mold resin 130 has been described. In a fifth embodiment, a configuration in which a lens LnC, which is a plane lens, is formed in the mold resin 130 will be described. Note that in an antenna module 100D of the fifth embodiment, description of configurations overlapping with the antenna module 100 of the first embodiment will not be repeated.

Figure 6:
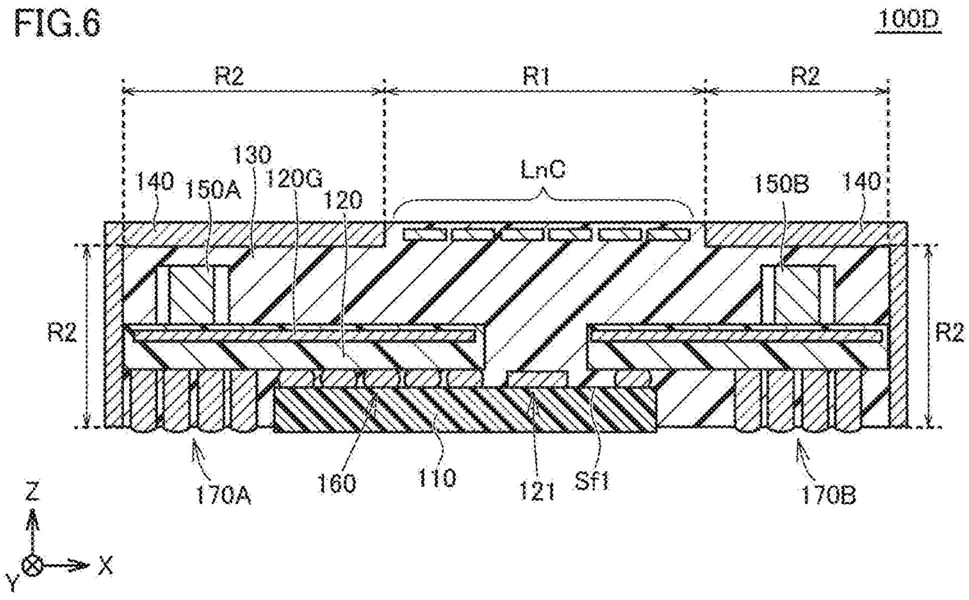
FIG. 6 is a sectional view of an antenna module according to a fifth embodiment.

FIG. 6 is a sectional view of the antenna module 100D according to the fifth embodiment. As illustrated in FIG. 6, in the antenna module 100D, the lens LnC formed in the mold resin 130 is a plane lens.

A plane lens is a lens that exhibits a planar-shaped lens effect formed by a metamaterial or the like. A metamaterial indicates an artificial material having electromagnetic or optical characteristics not possessed by a material existing in nature. A metamaterial has characteristics exhibiting negative permeability ($\mu<0$), negative permittivity ($\varepsilon<0$), or a negative refractive index (assuming both of the permeability and the permittivity are negative). As a result, even with a planar shape, the path of the radio wave radiated from the radiating electrode 121 can be changed. The lens LnC in the example of the antenna module 100D is formed by a frequency-selective surface (FSS), but may be a plane lens formed by other methods and materials.

In the antenna module 100D, described above, in which a plane lens is formed as well, a portion between the radiating electrode 121 and the lens LnC of the mold resin 130 is solid, and an interface between objects having significantly different permittivity does not exist. Therefore, compared to a case in which an air layer is formed between the radiating electrode 121 and the lens LnC, the ratio of generation of reflection of the radio wave radiated from the radiating electrode 121 decreases. Since the permittivity between the lens LnC and the radiating electrode 121 does not significantly change, a region in which the degree of change of the permittivity is large does not exist, whereby reflection of a radio wave can be suppressed, the antenna characteristics can be improved, and the height can be further reduced by using a plane lens.

Sixth Embodiment

In the antenna module 100 of the first embodiment, a configuration in which the connection member 160 that connects the RFIC 110 to the mount substrate 120 is disposed between the mount substrate 120 and the RFIC 110 has been described. In a sixth embodiment, an antenna module 100E having a configuration in which an intermediate member 190 is added to the configuration of the antenna module 100. Note that in the antenna module 100E of the sixth embodiment, description of configurations overlapping with the antenna module 100 of the first embodiment will not be repeated.

Figure 7:
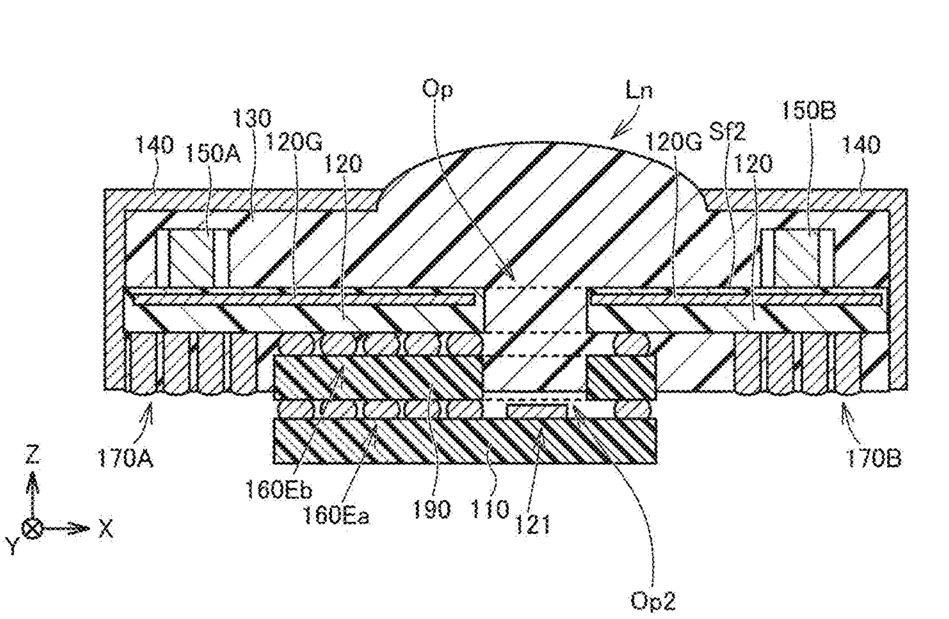
FIG. 7 is a sectional view of an antenna module according to a sixth embodiment.

FIG. 7 is a sectional view of the antenna module 100E according to the sixth embodiment. As illustrated in FIG. 7, in the antenna module 100E, the RFIC 110 is electrically connected to the intermediate member 190 with a coupling member 160Ea interposed therebetween. Assuming the mount substrate 120 is viewed in plan view, the intermediate member 190 has a cavity Op2 in a region overlapping with the cavity Op. A region of the cavity Op2 assuming the mount substrate 120 is viewed in plan view may be smaller than a region of the cavity Op assuming the mount substrate 120 is viewed in plan view. For the intermediate member 190, for example, a print substrate, a ceramic substrate, an interposer substrate made of silicon or glass, or a flexible substrate is used. The connection member 160Ea is disposed between a surface on the positive direction side of the Z-axis of the RFIC 110 and a surface on the negative direction side of the Z-axis of the intermediate member 190. The intermediate member 190 is electrically connected to the mount substrate 120 with a connection member 160Eb interposed therebetween. The connection member 160Eb is disposed between a surface on the positive direction side of the Z-axis of the intermediate member 190 and a surface on the negative direction side of the Z-axis of the mount substrate 120. Each of the connection members 160Ea and 160Eb includes six solder bumps. The connection members 160Ea and 160Eb may be connection members other than solder bumps.

In the antenna module 100E, described above, in which the intermediate member 190 is disposed between the RFIC 110 and the mount substrate 120 as well, a portion between the lens Ln and the radiating electrode 121 is filled with the mold resin 130. As a result, the permittivity between the lens Ln and the radiating electrode 121 does not significantly change. Therefore, a region in which the degree of change of the permittivity is large does not exist, and in the antenna module 100E, the intermediate member 190 can be mounted while reflection of a radio wave can be suppressed, and the antenna characteristics can be improved.

Seventh Embodiment

In the antenna module 100 of the first embodiment, a configuration in which the lens Ln is formed so as to project from the mold resin 130 has been described. In a seventh embodiment, a configuration in which by adjusting a position at which a lens LnF is formed, the lens LnF is prevented from physically interfering with an object such as an external device, and in addition, the height of the antenna module 100F as a whole can be reduced will be described. Note that in the antenna module 100F of the seventh embodiment, description of configurations overlapping with the antenna module 100 of the first embodiment will not be repeated.

Figure 8:
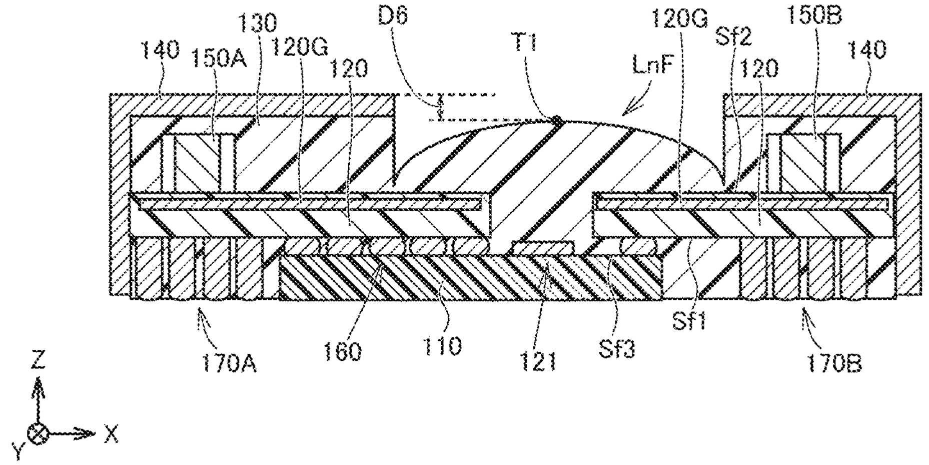
FIG. 8 is a sectional view of an antenna module according to a seventh embodiment.

FIG. 8 is a sectional view of the antenna module 100F according to the seventh embodiment. As illustrated in FIG. 8, compared to the lens Ln of the first embodiment, the lens LnF of the antenna module 100F is formed inside the mold resin 130. That is, a top T1 of a hemispherical shape of the lens LnF is disposed further on the negative direction side of the Z-axis than is a surface on the positive direction side of the Z-axis of the sputter shield 140. In other words, in the Z-axis direction, the top T1 and the surface on the positive direction side of the Z-axis of the sputter shield 140 are disposed apart by a distance D6. As a result, the lens LnF is prevented from physically interfering with an object such as an external device, and in addition, the height of the antenna module 100F as a whole can be reduced.

In the antenna module 100F, described above, in which the lens LnF is disposed further on the negative direction side of the Z-axis than is the sputter shield 140 as well, a portion between the lens LnF and the radiating electrode 121 is filled with the mold resin 130, whereby the permittivity between the lens LnF and the radiating electrode 121 does not significantly change, and a region in which the degree of change of the permittivity is large does not exist. Therefore, in the antenna module 100F, while reflection of a radio wave can be suppressed, and the antenna characteristics can be improved, the lens LnF is prevented from physically interfering with an object such as an external device, and in addition, the height of the antenna module 100F as a whole can be reduced.

Eighth Embodiment

In the antenna module 100 of the first embodiment, a configuration in which the radiating electrode 121 forms a patch antenna has been described. In an eighth embodiment, a configuration in which a radiating electrode 121G forms a dipole antenna will be described. Note that in an antenna module 100G of the eighth embodiment, description of configurations overlapping with the antenna module 100 of the first embodiment will not be repeated.

Figure 9:
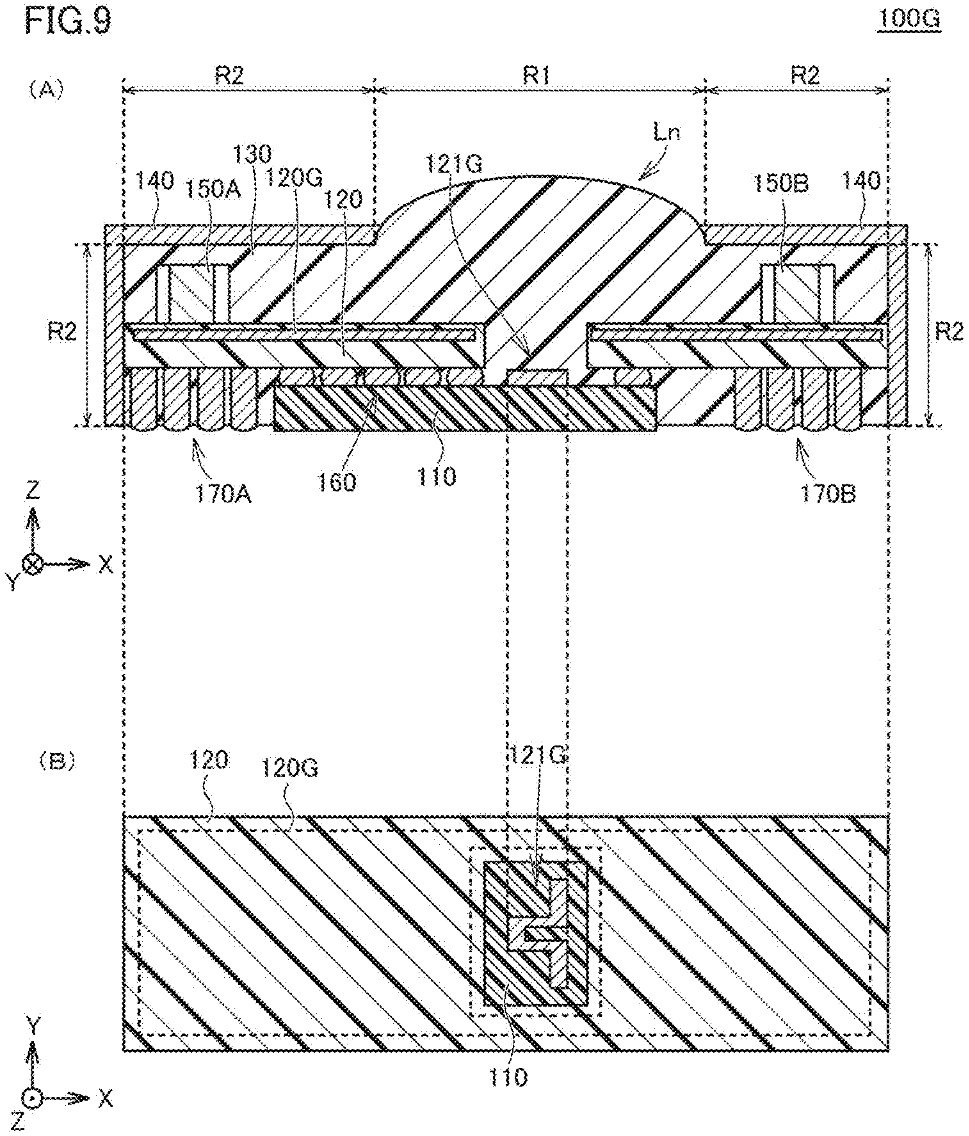
FIG. 9 includes a sectional view (FIG. 9 (A)) of an antenna module according to an eighth embodiment, and a plan view (FIG. 9 (B)) of an RFIC and a radiating electrode in FIG. 9 (A).

FIG. 9 includes a sectional view (FIG. 9 (A)) of the antenna module 100G according to the eighth embodiment, and a plan view (FIG. 9 (B)) of the RFIC 110 and the radiating electrode 121G in FIG. 9 (A). As illustrated in FIG. 9, the radiating electrode 121G forms a dipole antenna. Note that the radiating electrode 121G may be formed as an antenna other than a patch antenna and a dipole antenna. For example, the radiating electrode 121G can be formed as a slot antenna.

In the antenna module 100G, described above, having an antenna other than a patch antenna as well, since a region in which the degree of change of the permittivity is large does not exist between the lens Ln and the radiating electrode 121G, reflection of a radio wave can be suppressed, the antenna characteristics can be improved, and various antennas can be mounted.

The embodiments disclosed herein are illustrative and non-restrictive in every aspect. The scope of the present disclosure is defined by the terms of the claims, rather than by the description of the above-described embodiments, and is intended to include any modifications within the meaning and scope equivalent to the terms of the claims.

REFERENCE SIGNS LIST

10 COMMUNICATION DEVICE
100, 100A TO 100G ANTENNA MODULE
110 RFIC
111A TO 111D, 113A TO 113D, 117 SWITCH
112AR TO 112DR LOW NOISE AMPLIFIER
112AT TO 112DT POWER AMPLIFIER
114A TO 114D ATTENUATOR
115A TO 115D PHASE SHIFTER
116 SIGNAL MULTIPLEXER/DEMULTIPLEXER
118 MIXER
119 AMPLIFIER CIRCUIT
120 MOUNT SUBSTRATE
120G CONDUCTOR
121, 121C, 121G RADIATING ELECTRODE
122A TO 122H RADIATING ELEMENT
130, 130A, 130B MOLD RESIN
140 SPUTTER SHIELD
150A, 150B ELECTRONIC COMPONENT
160, 160Ea, 160Eb CONNECTION MEMBER
170A, 170B CONNECTION TERMINAL
180A, 180B CONDUCTIVE SHIELD
190 INTERMEDIATE MEMBER
200 BBIC
Ag1 TO Ag3 ANGLE
D1 TO D6 DISTANCE
Ln, LnC, LnF LENS
P1, P2 END PORTION
Op, Op2 CAVITY
R1 TO R3 REGION
Sf1 TO Sf3 SURFACE
T1 TOP

The invention claimed is:

1. An antenna module comprising:
a mount substrate that has a flat-plate shape having a first surface and a second surface, opposite the first surface, and includes a conductor;
a feeder circuit that is disposed on the first surface of the mount substrate, has a third surface facing the first surface, and supplies a radio-frequency signal;
a radiating electrode that is disposed on the third surface at a position not overlapping with the conductor;
a first dielectric filling a first cavity in the first surface such that the first dielectric is in contact with the radiating electrode and the first surface; and
a second dielectric filling a second cavity in the second surface such that the second dielectric is in contact with the second surface, wherein
the second dielectric forms a lens at a position of the second surface of the mount substrate that overlaps with the radiating electrode.

2. The antenna module according to claim 1, further comprising
a conductive layer that covers at least a part of the second dielectric, wherein
the second dielectric includes a first region that forms a lens portion and a second region other than the first region, and
the conductive layer is formed in the second region.

3. The antenna module according to claim 2, further comprising
an electronic component mounted on the mount substrate, wherein
the electronic component is disposed at a position not overlapping with the radiating electrode.

4. The antenna module according to claim 3, further comprising
a conductive member that is disposed between the electronic component and the feeder circuit.

5. The antenna module according to claim 4, wherein
the conductive member has a wall shape, a columnar shape, or a wire shape, and
a distance between the conductive member and the electronic component is longer than a distance between the conductive member and the radiating electrode.

6. The antenna module according to claim 5, wherein
the radiating electrode includes a first radiating element and a second radiating element,
a lens portion is a plane lens, and
the radiating electrode forms a patch antenna or a dipole antenna.

7. The antenna module according to claim 4, wherein
the conductive member has a wall shape, a columnar shape, or a wire shape, and
a distance between the conductive member and the radiating electrode is longer than a distance between the conductive member and the electronic component.

8. The antenna module according to claim 4, wherein
the radiating electrode includes a first radiating element and a second radiating element,
a lens portion is a plane lens, and
the radiating electrode forms a patch antenna or a dipole antenna.

9. The antenna module according to claim 3, wherein
the radiating electrode includes a first radiating element and a second radiating element,
a lens portion is a plane lens, and
the radiating electrode forms a patch antenna or a dipole antenna.

10. The antenna module according to claim 2, wherein
the radiating electrode includes a first radiating element and a second radiating element,
the lens portion is a plane lens, and
the radiating electrode forms a patch antenna or a dipole antenna.

11. The antenna module according to claim 1, wherein
a distance between a lens portion and the radiating electrode in a direction perpendicular to a plane surface of the mount substrate is equal to or longer than 1λ, where λ is a wavelength of a radio-frequency signal supplied by the feeder circuit.

12. The antenna module according to claim 1, wherein the radiating electrode includes a first radiating element and a second radiating element, a lens portion is a plane lens, and the radiating electrode forms a patch antenna or a dipole antenna.

* * * * *